United States Patent [19]

Brandt, Jr.

[11] 4,133,213

[45] Jan. 9, 1979

[54] STATIC AIR PRESSURE DIFFUSER

[75] Inventor: Robert O. Brandt, Jr., Cary, N.C.

[73] Assignee: Brandt Industries, Inc., Fuquay-Varina, N.C.

[21] Appl. No.: 855,976

[22] Filed: Nov. 30, 1977

[51] Int. Cl.² .............................................. G01L 7/00
[52] U.S. Cl. ...................................................... 73/756
[58] Field of Search ............ 73/756, 212, 700, 170 R, 73/384, 385, 189, 188

[56] References Cited

U.S. PATENT DOCUMENTS 2,838,932  6/1958  Dwyer ................................... 73/189

Primary Examiner—Donald O. Woodiel
Attorney, Agent, or Firm—Mills & Coats

[57] ABSTRACT

The present invention relates to a static air pressure diffuser that is adapted to be secured to an external probe extending from a structure for use in sensing and measuring static air pressure about the diffuser. Structurally, the static air pressure diffuser of the present invention comprises two generally circular flat plates secured together in spaced apart relationship with the lower plate being provided with a generally centrally located opening formed therein that is communicatively connected with the external probe when the static air pressure diffuser is properly mounted atop the probe. Between the two plates is defined an open area that is radially open to air currents from all directions therearound and which acts to channel air horizontally through the open space between the plates such that a true static air pressure reading may be taken about the opening formed in the lower plate between the two plates and wherein dynamic air pressure factors are minimized due to the horizontal flow of air currents perpendicular to the opening within the lower plate.

8 Claims, 2 Drawing Figures

STATIC AIR PRESSURE DIFFUSER

FIELD OF INVENTION

The present invention relates to air diffusers, and more particularly to a static air diffuser adapted to be mounted on a probe extending externally from a structure.

BACKGROUND OF INVENTION

The measurement of ambient atmospheric pressure (commonly referred to as static pressure) has, in the past, been accomplished with the acceptable results falling within a wide range of allowable tolerances. However, in recent years, the necessity of obtaining an accurate ambient atmospheric pressure reading has increased due to certain industrial conditions that now exist. For instance, in pharmaceutical plants where an internal pressure greater than that of the outside must be maintained in order to avoid contamination, a reliable method of monitoring the differential pressure must be used. Conversely, when nuclear material is to be used within an industrial complex, the internal pressure must be maintained at a lower level than that of the outside atmosphere. This particular pressure differential will prevent any nuclear contamination from escaping into the outside atmosphere.

The measurement of internal pressure is a relatively simple task due mainly to the fact that air currents within a building are usually low enough to permit accurate readings. However, in order to evaluate and measure the true static ambient atmospheric pressure which exists exteriorly of the building, it it important to take steps which negate the effects of wind velocity.

The most commonly used exterior probe has usually been a vertically extended pipe having its uppermost end open to the atmosphere and its lowermost end communicatively connected to a pressure sensing device. It is to be appreciated that this method could produce an erroneous static air pressure value, due mainly to adverse effects caused by nonhorizontal air movement across the exterior probe and other factors influencing dynamic static pressure.

SUMMARY OF PRESENT INVENTION

The static air pressure diffuser of the present invention has been developed to readily condition ambient atmospheric air such that the same may be used to produce an accurate static ambient air pressure reading. More particularly, the static air pressure diffuser of the present invention acts at all times to direct air currents perpendicular to an opening within the diffuser irrespective of the direction of the air currents. Effectively it is the area about the opening within the diffuser from which the static air pressure is measured.

Structurally the static air pressure diffuser of the present invention comprises first and second circular flat plates secured together in spaced apart relationship. One plate normally assumes a lower position and is provided with a central located opening therein. The two plates define a completely radially open area that channels and directs air currents therebetween such that the currents generally move perpendicular to the opening formed in the lower plate and consequently dynamic air pressure factors are negated about the opening area of the diffuser where the effective static air pressure measurement is taken. In use, the static air pressure diffuser of the present invention is mounted on an external probe extending from a structure such that the opening within the lowermost disposed plate is open to the atmosphere.

It is, therefore, an object of the present invention to provide a static air pressure diffuser for accurately measuring static ambient atmospheric pressure.

Another object of the present invention is to provide a static air pressure diffuser which when properly oriented will readily prevent erroneous static air pressure measurement due to multi-directional and turbulent air currents.

An even further object of the present invention is to provide a static air pressure diffuser which incorporates an inclement weather shielding capability whereby precipitation is prohibited from entering the sensing area of the diffuser.

Another object of the present invention is to provide a static air pressure diffuser which is adapted to be installed atop an open ended pipe forming the external probe, whereby accurate static air pressure readings may be produced.

An even further object of the present invention is to provide a static air pressure diffuser which incorporates two circular plates, oriented in parallel planes and spaced apart whereby an open area is formed therebetween.

Another object of the present invention is to provide a static air pressure diffuser which is simple and inexpensive in construction.

In addition, a further object of the present invention is to provide a static air pressure diffuser which substantially eliminates adverse effects produced by multi-directional air currents which pass about the probe.

Another object of the present invention is to provide a static air pressure diffuser which readily directs multi-directional air currents in a horizontal direction thereby allowing a continuous static air pressure reading to be taken normal to such horizontal movement.

Other objects and advantages of the present invention will become apparent from a study of the following description and the accompanying drawings which are merely illustrative of the present invention.

DETAILED DESCRIPTION OF PREFERRED EMBODIMENT

Figure 1:
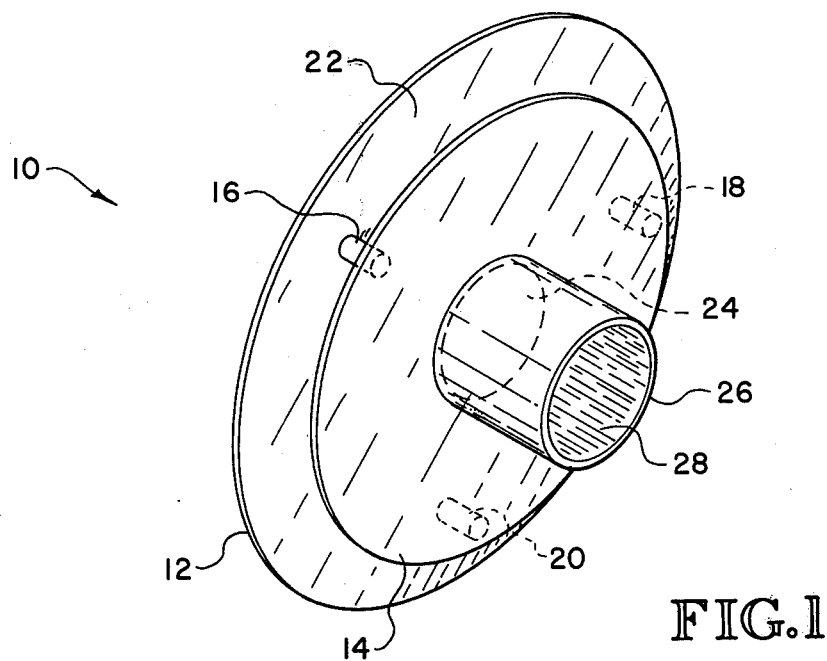
FIG. 1 is a perspective view of the static air pressure diffuser of the present invention as viewed from underneath and to one side thereof.

With further reference to the drawings, particularly FIG. 1, a static air pressure diffuser is shown therein and generally indicated by the numeral 10. Static air pressure diffuser 10 comprises an upper circular and generally flat plate 12 being held apart from and parallel to a lower circular and generally flat plate 14 by three spacer studs 16, 18 and 20. Spacers 16, 18 and 20 are secured to plates 14 and 12 by weldment or other suitable fastening means such that plates 14 and 12 are held rigidly apart thereby forming an open area 22 therebetween. It is seen that open area 22 is completely radially open about the diffuser 12.

Lower circular plate 14 is of a smaller diameter than upper circular plate 12 and additionally has formed therein a central opening 24. A cylindrical coupling 26 having an interior opening 28 is secured to a lower side of lower circular plate 14 about central opening 24 whereby open area 22 is communicatively connected to the interior opening 28 of coupling 26.

Figure 2:
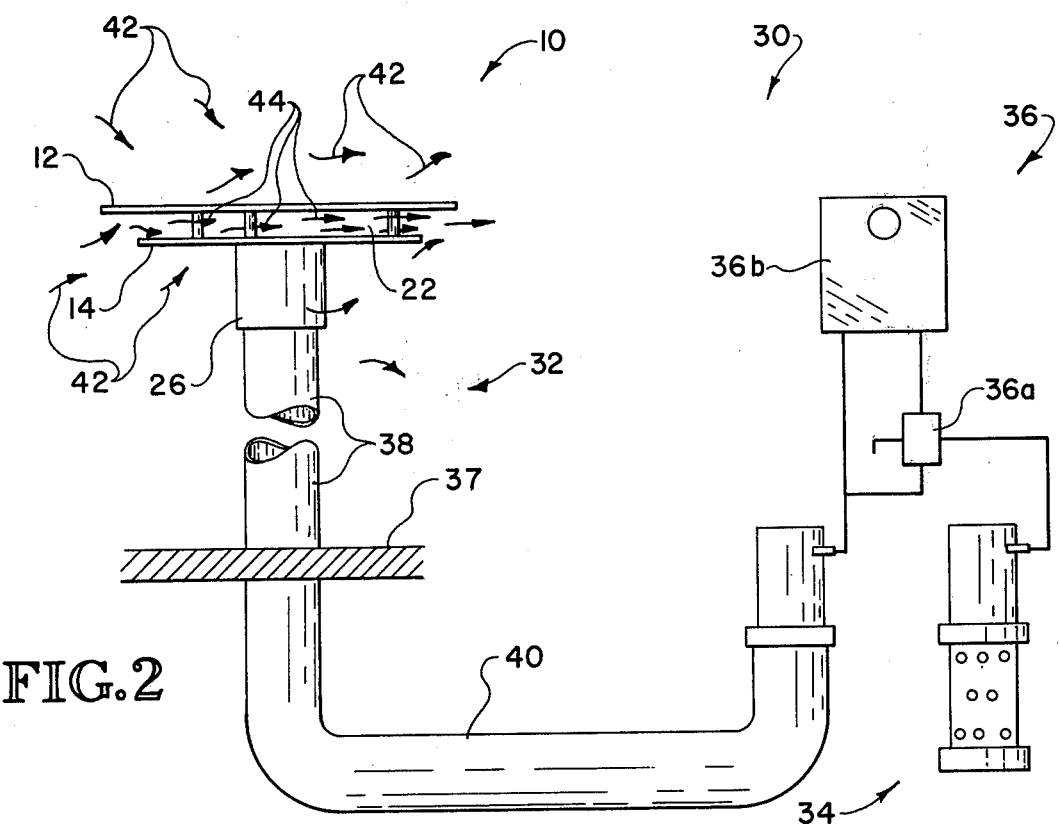
FIG. 2 is a diagrammatic illustration of a differential air pressure monitoring system which incorporates the static air pressure diffuser of the present invention.

Viewing FIG. 2 in detail, a pressure differential monitoring system is shown therein and generally indicated by the numeral 30. Basically differential air pressure monitoring system 30 comprises an exterior probe 32, an interior diffuser-probe 34, and a zeroing and transmitting subsystem 36.

Viewing external probe 32 in greater detail, it may be seen that the same extends vertically through building roof 37 and comprises an external pipe section 28 having the static air pressure diffuser 10 attached to its uppermost end. Additionally, exterior probe 32 is communicatively connected to the zeroing and transmitting system 36 located within the structure by a duct 40.

Interior diffuser-probe 34 is disposed in the interior of the building and is communicatively connected to the zeroing and transmitting subsystem 36 either directly as shown in FIG. 2 or by a duct.

With additional reference to FIG. 2, one may observe the way in which the static air pressure diffuser 10 is secured atop pipe 38 by coupling 26. The static air pressure diffuser 10 is secured to pipe 38 by appropriately threading the coupling 26 and the attaching end of pipe 38 in order that the two can be screwed together, or by other suitable securing means.

In actual operation, the static air pressure diffuser 10 of the present invention is secured atop the external pipe 38 at a distance of approximately 10 feet above roof 37 of the particular structure. The static air pressure diffuser 10 is oriented such that the upper and lower circular plates 12 and 14, respectively, are perpendicular to the axis of pipe 38.

As viewed in FIG. 2, air currents illustrated by arrows 42 move randomly about the static air diffuser 10 such as would occur in a normal atmospheric environment. By paying particular attention to the open area 22 formed between upper and lower plates 12 and 14, it may be seen that the static air diffuser readily accepts randomly flowing air currents 42 and aligns the same during their movement through the open area such that a horizontal current of air 44 is formed. This horizontal air current 44, being a controlled current, allows the true static ambient air pressure to be measured about opening 24 with minimum effect from dynamic air pressure factors.

It should be appreciated by one skilled in the art that the static air pressure diffuser of the present invention will cause a horizontal air current 44 to flow normal to the pipe 38 irrespective of random air current directions. This fact allows an accurate static ambient atmospheric air pressure reading to be taken about opening 24.

The static air pressure diffuser of the present invention presents a device that is of significant value when the attainment of ambient atmospheric pressure is desired. The present invention is both economical and simple in construction and additionally may be easily installed on a building and may be used for determining differential static air pressure between outside and inside areas. The utility of the present invention is especially noteworthy when considering the quick changeover from the inaccurate open end pipe.

In a preferred design of the static air pressure diffuser 10 discussed above, the distance between upper and lower plates 12 and 14 was designed to be 1.0 inch. For the same design, the diameter of the upper plate 12 was 14.375 inches and the diameter of the lower plate 14 was 11.50 inches. It is contemplated that the diameter of each of the plates, i.e., the upper and lower plates 12 and 14, respectively, should be of a diameter at least three times the distance between the upper and lower plates 12 and 14, respectively. It is also contemplated that for good results and for an economical design that the distance between the upper and lower plates 12 and 14, respectively, should be at least 0.75 inches, and that the diameter of the lower plate should be between 7.5 and 15 inches while the diameter of the upper plate might preferably be between 8.5 and 20 inches.

As had already been stated and as illustrated in FIG. 2, the static air pressure diffuser 10 is adapted to work in conjunction with a system that is designed to determine differential static air pressure between an area outside of a structure and the inside area of that structure. In discussing this total system, reference has been made to a zeroing and transmitting subsystem, indicated generally by the numeral 36. This subsystem is basically designed to be responsive to the static air pressure differential existing between an area outside the structure and the area inside of the structure. Although details of this system are not per se material to the present invention, it should be pointed out that subsystem 36 basically comprises a zeroing manifold valve 36a operatively connected, as illustrated in FIG. 2, between the external and internal diffusers and a transmitter indicated by 36b. Details of transmitter 36b will also not be dealt with herein in detail except to point out that such is commerically available from Brandt Industries, Inc., having its principal place of business at Fuquay-Varina, North Carolina, and in the system illustrated in FIG. 2, the pressure transmitter suggested to be used in such design is that known as the 2500 Series.

The terms "upper", "lower", etc., have been used herein merely for the convenience of the foregoing specification and in the appended Claims to describe the static air pressure diffuser and its parts as oriented in the drawings. It is to be understood, however, that these terms are in no way limiting to the invention since the static air pressure diffuser may obviously be disposed in many different positions when in actual use.

The present invention, of course, may be carried out in other specific ways that those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A static air pressure diffuser adapted to be mounted atop a main probe extending externally from a structure for sensing static air pressure about said static air pressure diffuser, said static air pressure diffuser comprising: a generally circular and flat lower plate; a generally circular and flat upper plate disposed in parallel relationship to said lower plate and vertically spaced therefrom so as to define an open area between said first and second plates, said upper plate being of a greater diameter than said lower plate and so oriented and spaced above said lower plate such that said upper plate includes a generally circular overhang area that extends outwardly above the outside generally terminal edge of said lower plate, and wherein the diameter of said lower and upper plates is at least three times the vertical distance between said respective plates; interconnecting means secured between said lower and upper plates for maintaining said two plates in parallel and vertical spaced apart relationship; opening means formed generally centrally within said lower plate; and coupling means associated with said static air diffuser for coupling said static air diffuser with said main probe such that said opening means formed in said lower plate is communicatively connected with said main probe when said static diffuser is properly mounted and secured atop said main probe, whereby static air pressure above said opening means and generally between said plates can be sensed and measured in this area without significant influence from dynamic air pressure factors since air moving between said plates is constrained to move generally parallel therebetween and perpendicular to said opening means.

2. The static air pressure diffuser of claim 1 wherein said distance between said upper and lower plates is at least 0.75 inches; and wherein said diameter of said lower plate is at least 7.5 inches but less than 15.0 inches, and wherein the diameter of said upper plate is at least 8.5 inches but less than 20 inches.

3. The static air pressure diffuser of claim 1 wherein said coupling means includes a pipe coupling secured to one side of said lower plate in alignment with said centrally located opening means formed therein, wherein said pipe coupling is adapted to be connected directly to said main probe extending exteriorly of said structure whereby the static air pressure above said opening means in the area between said lower and upper generally circular plates can be sensed.

4. The air pressure diffuser of claim 3 wherein said interconnecting means includes at least three studs secured between said lower and upper plates with said studs being generally circumferentially spaced about said opening means formed within said lower plate.

5. A static air pressure diffuser adapted to be mounted atop a probe extending externally from a structure for sensing static air pressure while minimizing dynamic air pressure factors, said static air pressure diffuser comprising: a first generally flat plate having a terminal outer edge; a second generally flat plate having a terminal outer edge with said second plate being disposed in a plane parallel to said first plate and vertically spaced relative thereto to form a radially open area therebetween that tends to diffuse and direct air from any radial direction between said first and second plates in a direction generally parallel to the plane of each plate, said first plate being disposed about a lower position and said second plate assumes a vertically spaced upper position above said lower plate and wherein the diameter of said second upper plate is greater than the diameter of said first lower plate and wherein said second upper plate is oriented such that an outer edge thereof extends outwardly over the outer edge of said first lower plate so as to define an overhang over the terminal edge of said first lower plate; support means associated with said static air diffuser for supporting said plates in parallel spaced apart relationship; opening means generally centrally formed in at least one plate; and coupling means associated with said static air pressure diffuser for coupling said static air diffuser with said probe such that said generally centrally located opening means formed in at least one plate is communicatively connected to said probe, whereby static air pressure in the area adjacent said opening means and generally between said plates can be measured without significant influence from dynamic air pressure factors because said plates tend to direct air currents therebetween in a direction perpendicular to said opening formed within at least one plate.

6. The static air pressure diffuser of claim 5 wherein said outer terminal edge of said first and second plates is generally circular so as to define a generally circular 360 degree radial opening around an outer edge of said static air pressure diffuser between said plates.

7. The static air pressure diffuser of claim 5 wherein said diameter of each of said first and second plates is at least four times the vertical distance between said first and second plates.

8. The static air pressure diffuser of claim 7 wherein said opening means is formed centrally within said first lower plate and wherein said coupling means includes a pipe coupling secured to said lower plate in alignment with said opening means such that when said pipe coupling is secured atop said probe the static air pressure diffuser is adapted to sense and measure the static air pressure above said opening in the area between said first and second plates.

* * * * *